US006876647B2

United States Patent
Celi, Jr.

(10) Patent No.: US 6,876,647 B2
(45) Date of Patent: Apr. 5, 2005

(54) DYNAMIC PRIORITY ADJUSTMENT IN A REAL TIME STREAMING ENGINE

(75) Inventor: Joseph Celi, Jr., Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 09/834,274

(22) Filed: Apr. 12, 2001

(65) Prior Publication Data

US 2002/0150082 A1 Oct. 17, 2002

(51) Int. Cl.[7] .............................................. H04L 12/66
(52) U.S. Cl. ..................................... 370/352; 370/356
(58) Field of Search ................................ 370/352, 353, 370/354, 355, 356

(56) References Cited

U.S. PATENT DOCUMENTS 6,615,173 B1 * 9/2003 Celi, Jr. ...................... 704/260
6,654,722 B1 * 11/2003 Aldous et al. ............ 704/270.1
2002/0107594 A1 * 8/2002 Taylor et al. ................. 700/94
2003/0145088 A1 * 7/2003 Bhogal et al. .............. 709/226

* cited by examiner

Primary Examiner—Melvin Marcelo
(74) Attorney, Agent, or Firm—Akerman Senterfitt

(57) ABSTRACT

A voice data streaming method can include establishing a voice call connection with a VoIP gateway; receiving audio data from a network source; assigning a high priority to a thread of execution in which the received audio data can be streamed to the VoIP gateway; and, reducing the high priority to a normal priority when the received audio data has been completely streamed to the VoIP gateway. Notably, the step of receiving audio data from a network source can include receiving a recorded audio prompt from the network source. Similarly, the step of receiving audio data from a network source can include receiving synthesized audio from a text-to-speech (TTS) engine. The method also can include the step of streaming silence data in the thread of execution after the high priority has been reduced to the normal priority. Finally, the method can include the step of packetizing the audio data for transmission over a packet-switched network; and, streaming the packetized audio data in the high priority thread of execution according to RTP.

25 Claims, 2 Drawing Sheets

DYNAMIC PRIORITY ADJUSTMENT IN A REAL TIME STREAMING ENGINE

BACKGROUND OF THE INVENTION

1. Technical Field

This invention relates to the field of Internet Protocol (IP) telephony and more particularly to dynamic priority adjustment in a real time streaming engine (RTSE).

2. Description of the Related Art

Until recently, the World Wide Web (the "Web") has relied exclusively on visual interfaces to deliver information and services to end-users through conventional computers. In doing so, a substantial potential base of end users has been ignored: those who because of time, location or cost constraints do not have access to a conventional computer. Still, many end users can access a telephone. Hence, providing "conversational access" to the Web permits Web sites to reach this untapped group of end users.

Conversational access to the Web can be defined as processing spoken input and audio output by way of a voice input device such as a telephone, radio, voice-enabled computing device and the like. Users of conversational access can benefit from the convenience of mobile use of the Internet for transactions while transaction providers incorporating conversational interfaces in their Web sites can benefit from the low transaction costs of the Internet. Additionally, unlike applications configured with a telephonic interface which rely on DTMF input, applications configured with a conversational interface can be used in a hands-free or eyes-free environment.

Recently, improvements in voice algorithms and substantial increases in computer processing power have facilitated advancements in conversational interfaces for Web-enabled applications. Moreover, recent advances in packet-switched multimedia transport technologies have eased the task of integrating telephony applications for processing voice data received over a Public Switched Telephone Network (PSTN) with data applications operating in packet-switched networks such as the Internet. Support for voice communications using the Internet Protocol (IP), often referred to as "voice over IP" (VoIP), is one such advancement in packet-switched multimedia transport. These improvements and advances have assisted voice application developers in making voice the most natural and efficient interface to the Web. Still, deficiencies remain.

Specifically, conventional voice call processing systems which provide a conversational interface to Web-enabled applications can be configured to process multiple voice calls simultaneously. Many such conventional voice call processing systems can use the Real Time Protocol (RTP) to transmit and receive audio data so as to ensure the real time processing of voice data all the while avoiding problems commonly associated with computer-based audio processing like timing jitter. In particular, voice data packets can be received in a VoIP gateway from voice call end points in the PSTN and can be forwarded using RTP to a real time streaming engine (RTSE) disposed in a packet switched network. Conversely, audio data, such as synthesized speech audio or recorded, digital audio, can be provided to the RTSE by a network source and streamed from the RTSE to the VoIP gateway en route to selected voice call end points, again using RTP.

Notably, according to the RTP protocol, audio data packets must be sent within a specific amount of time. For instance, in the case of some commercially available VoIP gateways, packets of audio data are separated by twenty milliseconds. Thus, when processing multiple concurrent voice calls, a conventional RTSE must ensure that outgoing audio packets are forwarded to the VoIP gateway in a timely manner. In order to satisfy these strict timing requirements, however, conventional RTSEs utilizes high priority threads for every outgoing audio stream.

Still, only so much CPU capacity exists on any given computing device used to host an RTSE. Eventually, as the number of concurrent voice calls processed by the RTSE increases, the CPU bandwidth can become fully utilized. When the CPU bandwidth becomes fully utilized, the operating system can no longer provide all of the high priority threads for the necessary time slices required to send audio data in a timely manner. Conventional voice call processing systems are deficient in this regard. Accordingly, there exists a need for an enhanced method and system for streaming audio data to and from voice call end points in a voice call processing system.

SUMMARY OF THE INVENTION

The present invention is an enhanced method and system for streaming audio data to and from voice call end points in a voice call processing system. According to the present invention, a real time streaming engine (RTSE) in a voice server can be used to stream audio data to a VoIP gateway. The VoIP gateway can be configured to perform a dynamic priority adjustment process in which audio data can be transmitted to the VoIP gateway in a high-priority thread of execution. In contrast, when silence data is to be transmitted to the VoIP gateway, the priority of the thread responsible for transmitting audio to the VoIP gateway can be reduced. In this way, the number of threads which can be allocated by the RTSE is optimized and the RTSE can process more concurrent voice calls than a conventional RTSE.

A voice call processing system which has been configured in accordance with the inventive arrangements can include one or more voice call end points; a voice over IP (VoIP) gateway for processing voice calls from the voice call end points; a voice server communicatively linked to the VoIP gateway; a real time streaming engine (RTSE) disposed in the voice server; at least one high priority thread allocatable by the RTSE for streaming audio data to the VoIP gateway; and, at least one normal priority thread allocatable by the RTSE for transmitting silence data to the VoIP gateway. The voice call processing system also can include an network source of audio data communicatively linked to the RTSE, the network source providing audio data to the RTSE to be streamed to the VoIP gateway. In one aspect of the present invention, the network source can be a text-to-speech (TTS) engine disposed in the voice server. By comparison, in another aspect of the present invention, the network source can be a source of recorded audio disposed in the voice server. Notably, the voice call processing system of the present invention can include a dynamic priority adjustment processor for adjusting priority levels for the high priority and normal priority threads.

A voice server which has been configured in accordance with the inventive arrangements can include an RTSE; at least one call channel through which audio and silence data can be exchanged with VoIP gateway; at least one network data channel through which audio data can be exchanged with a network source of audio data; and, a dynamic priority adjustment processor for selectively prioritizing threads of execution in which both audio data received in the RTSE over the network data channel and silence data can be transmitted over the call channel to the VoIP gateway. In one aspect of the present invention, the network source of audio data can be a TTS engine.

The present invention also contemplates a voice data streaming method. In one aspect of the present invention, the method can include the steps of establishing one or more voice call connections with a VoIP gateway; receiving audio data from a network source; allocating a high priority thread for streaming the received audio data to a selected one of the voice call connections through the VoIP gateway; and, allocating a reduced priority thread for transmitting silence data to the VoIP gateway. Notably, the step of allocating a reduced priority thread can include allocating a normal priority thread for transmitting silence data to the VoIP gateway. Additionally, the step of receiving audio data can include receiving audio data from the network source; packetizing the audio data; and, streaming the packetized audio data to selected ones of the plurality of voice call connections through the VoIP gateway. Finally, the streaming step can include transmitting the packetized audio data according to the real time protocol (RTP).

In a second aspect of the present invention, the method can include establishing a voice call connection with a VoIP gateway; receiving audio data from a network source; assigning a high priority to a thread of execution in which the received audio data can be streamed to the VoIP gateway; and, reducing the high priority to a normal priority when the received audio data has been completely streamed to the VoIP gateway. Notably, the step of receiving audio data from a network source can include receiving a recorded audio prompt from the network source. Similarly, the step of receiving audio data from a network source can include receiving synthesized audio from a text-to-speech (TTS) engine. The method also can include the step of streaming silence data in the thread of execution after the high priority has been reduced to the normal priority. Finally, the method can include the step of packetizing the audio data for transmission over a packet-switched network; and, streaming the packetized audio data in the high priority thread of execution according to RTP.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a method and system for streaming audio data over multiple voice call channels via a Voice over IP (VoIP) gateway. Specifically, a real time streaming engine (RTSE) used to stream audio data to a VoIP gateway can be configured to perform a dynamic priority adjustment process in which audio data can be transmitted to the VoIP gateway in a high-priority thread of execution. In contrast, when silence data is to be transmitted to the VoIP gateway, the priority of the thread responsible for transmitting audio to the VoIP gateway can be reduced. In this way, the number of threads which can be allocated by the RTSE is optimized and the RTSE can process more concurrent voice calls than a conventional RTSE.

Figure 1:
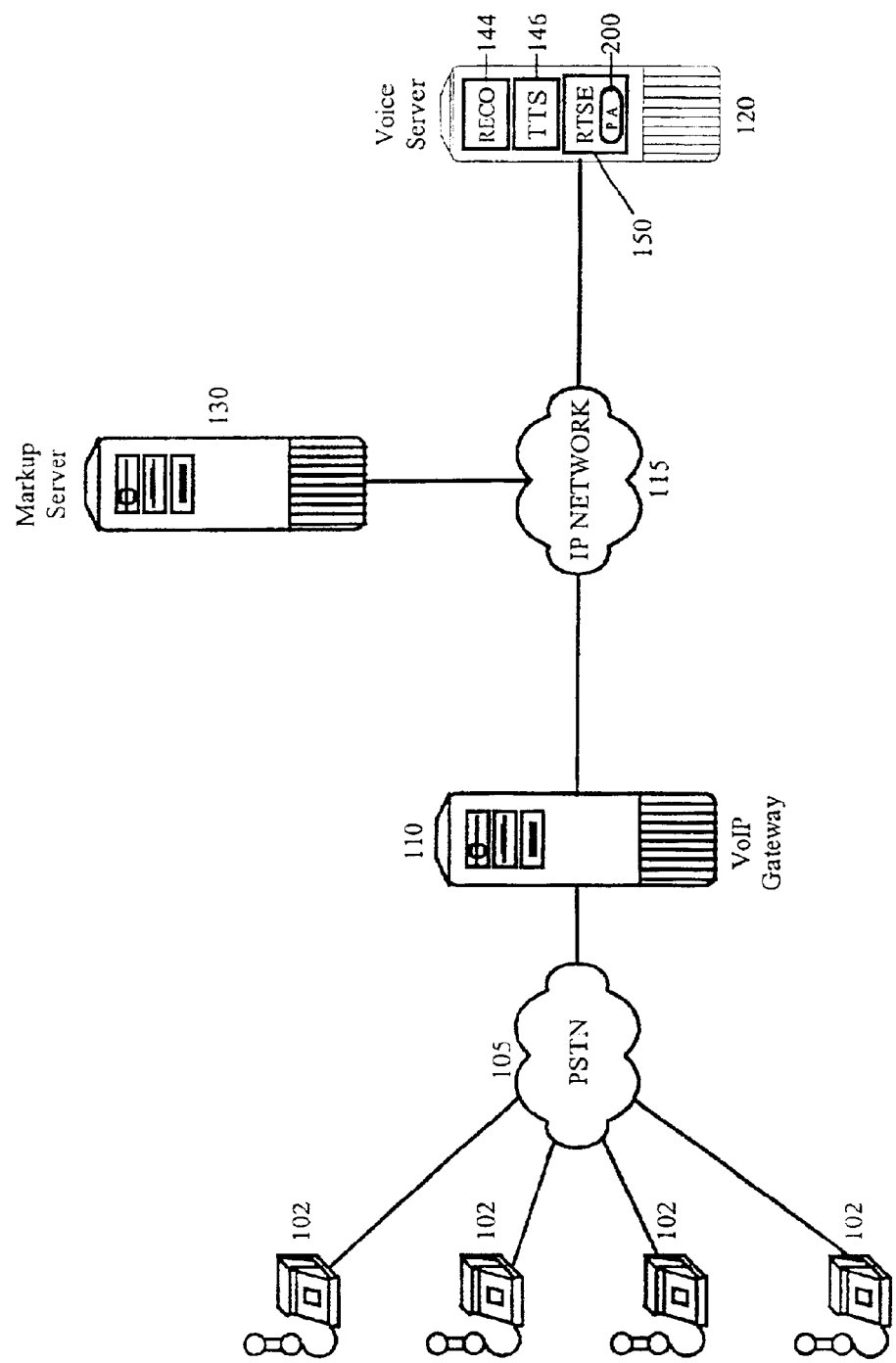
FIG. 1 is a schematic illustration of a voice call processing system configured in accordance with the inventive arrangements.

FIG. 1 is a schematic diagram illustrating a voice call processing system which has been configured in accordance with one aspect of the present invention. Specifically, as shown in FIG. 1, the voice call processing system 100 can include one or more voice call end points 102 which are configured to transmit and receive audio data over a public switched telephone network (PSTN) 105. As referred to herein, the term "audio data" can include, but is not intended to be limited to, human speech, both in analog and digital form, and other audible sounds. Notably, audio data includes synthesized and recorded speech. Additionally, the use of the term "voice data" refers to audio data which can be interpreted as human speech.

Audio data provided by the voice call end points 102 can be received in a VoIP gateway 110. In general, as is well known in the art, VoIP gateways can be used to interconnect packet-switched networks such as the Internet with the PSTN. The VoIP gateway 110 of the present invention, like conventional VoIP gateways, can receive audio data from voice call end points 102 and can process and packetize the audio data in a manner suitable for use in a packet-switched network such as the IP network 115. Conversely, the VoIP gateway 110 can receive packetized audio data from the IP network 115 and can process and format the audio data in a manner suitable for use in the PSTN 105.

A voice server 120 also can be provided which can be configured to process voice data formatted for transmission in the IP network 115. The voice server 120 can receive VoIP-formatted audio data from sources in the IP network 115 such as the VoIP gateway 110. The voice server 120 can reconstruct received voice data into digitized speech and can provide the digitized speech to a resident application such as a speech recognition engine 144. Alternatively, the voice server 120 provide the digitized speech to a remote application such as a remotely positioned speech recognition engine.

The voice server 120 also can receive digitized speech, for example synthesized speech from a text-to-speech (TTS) engine 146, or recorded speech audio, from a speech source in the IP network 115. Specifically, the voice server 120 can include a real time streaming engine (RTSE) 140 which can be used to stream audio data onto the IP network 115. For example, a text-to-speech engine can provide digitized speech audio to the voice server 120. In one aspect of the invention, the digitized speech can arise from the processing of markup, such as VoiceXML markup provided by a markup server 130. In any case, the voice server 120 can format digitized speech audio into a format suitable for transmission over the IP network 115. Subsequently, the RTSE 140 can stream the formatted audio onto the IP network 115 to an intended destination, for instance the VoIP gateway 110.

In operation, voice calls can be established over the PSTN 105 between the VoIP gateway 110 and one or more voice call end points 102. The VoIP gateway 110 can process each voice call, formatting speech audio into audio data which can be transmitted over IP network 115. In particular, the VoIP gateway 110 can format audio signals received from the PSTN 105 into VoIP-compliant audio data packets. Subsequently, the audio data can be forwarded over the IP network 115 to the voice server 120.

The voice server 120 can receive audio data from the VoIP gateway 110 and can reconstruct individual audio data packets into a digitized representation of the speech audio initially provided to the VoIP gateway 110. Subsequently, the reconstructed voice data can be provided to speech-enabled application such as a speech recognition engine 144. Concurrently, the voice server 120 can receive audio data from network sources such as TTS engine 146. In particular, the RTSE 140 can receive the audio data and can format the audio data into VoIP-compliant packets so that the audio data can be streamed to network devices in the IP network 115. More particularly, the voice data can be formatted to accommodate the real-time transmission requirements of the VoIP gateway 110. Subsequently, the formatted audio data can be forwarded to the VoIP gateway 110 using the Real Time Protocol (RTP). Importantly, when the voice server 120 does not stream VoIP-compliant audio packets to the VoIP gateway 110, the voice server 120 can stream silence data to the VoIP gateway 110 so as to maintain the call connection with the VoIP gateway 110 as is well known in the art.

In accordance with the inventive arrangements, the voice server 120 can process voice calls with multiple voice call sources wherein each voice call can be multiplexed, for example time division multiplexed as is well-known in the art. Unlike conventional voice servers, however in which the streaming of all data to a VoIP gateway is included in a process allocated to a high priority thread, the present invention can include a dynamic priority adjustment (PA) processor 200 in which the priority of the thread can be strategically adjusted depending on whether audio data or silence data is to be transmitted to the VoIP gateway 110. Notably, the PA processor 200 can be included as part of the RTSE 150 or the PA processor 200 can be separately accessible by the RTSE 150.

In the PA processor 200, only audio data is streamed to the VoIP gateway 110 using a high priority thread. Silence data, unlike audio data is streamed to the VoIP gateway 110 using a reduced priority thread, for instance a normal priority thread. In this way, the number of voice calls which can be processed by the voice server 120 can be optimized. In one aspect of the invention, a single thread is utilized to stream outgoing audio packets to the VoIP gateway 110. In this case, the priority of the single thread can be modified dynamically in accordance with the inventive arrangements. Notwithstanding, the invention is not limited to the use of a single thread of execution for streaming outgoing audio packets to the VoIP gateway 110. Rather, multiple threads can be utilized, each having an assigned priority. Moreover, in another aspect of the invention, a thread can be assigned for each call connection established between the VoIP gateway 110 and the Voice Server 120.

Figure 2:
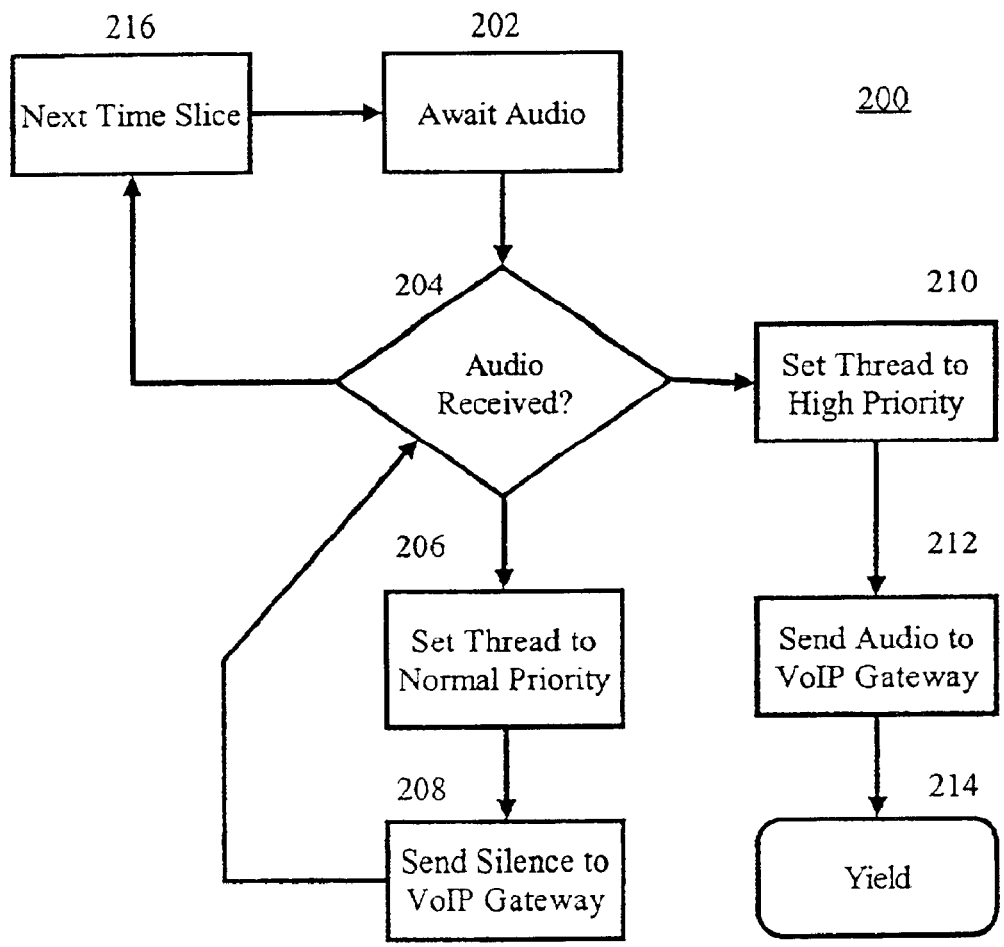
FIG. 2 is a flow chart illustrating an exemplary dynamic priority adjustment process of the present invention.

FIG. 2 is a flow chart illustrating a process performed in the dynamic PA process 200 for use with the RTSE 140 of FIG. 1. It is assumed in FIG. 2, that the RTSE is configured to process multiple concurrent call connections with a VoIP gateway. The multiple call connections can be multiplexed so as to be manageable by the RTSE. In the illustration of FIG. 2, the call connections can be time-multiplexed, wherein each call connection is assigned to a particular time slice. Moreover, as will be apparent to one skilled in the art, in the PA process 200 depicted in FIG. 2, a single thread of execution is used to send outgoing audio packets to a VoIP gateway for each established voice call connection. Notwithstanding, the invention is not to be limited to the particular thread configuration illustrated in FIG. 2. Rather, multiple threads can be used to stream audio and silence data to the VoIP gateway while remaining true to the scope of the present invention.

The process can begin in block 202 in which the RTSE awaits the receipt of audio data in a first time slice from a network source such as a TTS engine or a source of recorded audio. An example of pre-recorded audio can include pre-recorded audio prompts for use in an interactive voice response system. In decision block 204, if no audio is received, the RTSE must transmit silence data to the VoIP gateway in order to maintain the call connection. By comparison, if in decision block 204 audio data is received in the RTSE, the audio data can be packetized and streamed to the VoIP gateway. In any case, a separate thread of execution is utilized so that regardless of the result in decision block 204, the RTSE can await the receipt of audio data in the next time slice. Moreover, it will be apparent to one skilled in the art that the particular steps described by blocks 202 through 214 apply separately to each time slice assigned to a particular call connection.

If in decision block 204, audio data is received, in block 210, the priority of the thread responsible for streaming audio packets can be adjusted to a high priority. Subsequently, in block 212, the received audio data can be packetized and queued for transmission to the VoIP gateway in the high-priority thread of execution. Once the audio packets have been fully transmitted to the VoIP gateway, in block 214 the thread can yield processing cycles to other processes in the Voice Server. In contrast, if in block 204 audio is not received, in block 206, the priority of the thread responsible for streaming audio packets can be reduced to a normal priority. Subsequently, in block 208, silence data can be packetized and queued for transmission to the VoIP gateway in the reduced-priority thread of execution. Notably, the RTSE can continue to transmit silence data to the VoIP gateway for the particular call connection until audio data is received for that call connection at which point the process can repeat.

Significantly, as will be apparent to one skilled in the art, when the RTSE transmits silence data to the VoIP, it is not as important to adhere to the absolute strict timing requirements associated with transmitting real time audio data over a computer communications network. More particularly, whereas users can detect lost audio packets resulting from timing jitter, users cannot similarly detect lost silence packets. Moreover, conventional VoIP gateways can provide "gap filling algorithms" for missing silence data. Hence, if the VoIP gateway does not timely receive silence data, these gap filling algorithms can compensate. In contrast, these same gap filling algorithms can negatively effect the quality of audio data presented to the user. Accordingly, the PA process 200 can capitalize on the availability of gap filling algorithms while avoiding the inherent deficiencies of the gap filling algorithms when applied to audio data. In sum, by reducing the priority of threads used to stream audio data to the VoIP gateway, the operating system scheduler can allocate CPU processing cycles to other audio data sending threads that are in the process of sending non-silence audio to the VoIP gateway. As a result, the RTSE can accommodate more concurrent voice calls.

Aspects of the present invention can be realized in computing system consisting of hardware, software, or a combination of hardware and software. Specifically, the method of the present invention can be realized through the use of electronic communications and transactions in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A voice call processing system comprising:
   a plurality of voice call end points;
   a voice over IP (VoIP) gateway for processing voice calls from said plurality of voice call end points;
   a voice server communicatively linked to said VoIP gateway;
   a real time streaming engine (RTSE) disposed in said voice server;
   at least one high priority thread allocatable by said RTSE for streaming audio data to said VoIP gateway; and,
   at least one normal priority thread allocatable by said RTSE for transmitting silence data to said VoIP gateway.

2. The voice call processing system of claim 1, further comprising:
   an network source of audio data communicatively linked to said RTSE, said network source providing audio data to said RTSE to be streamed to said VoIP gateway.

3. The voice call processing system of claim 2, wherein said network source is a text-to-speech (TTS) engine disposed in said voice server.

4. The voice call processing system of claim 2, wherein said network source is a source of recorded audio disposed in said voice server.

5. The voice call processing system of claim 1, further comprising:
   a dynamic priority adjustment processor for adjusting priority levels for said high priority and normal priority threads.

6. A voice server comprising:
   a real time streaming engine (RTSE);
   at least one call channel through which audio and silence data can be exchanged with a voice over IP (VoIP) gateway;
   at least one network data channel through which audio data can be exchanged with a network source of audio data; and,
   a dynamic priority adjustment processor for selectively prioritizing threads of execution in which both audio data received in said RTSE over said network data channel and silence data can be transmitted over said call channel to said VoIP gateway.

7. The voice server of claim 6, wherein said network source of audio data is a text-to-speech engine.

8. A voice data streaming method comprising the steps of:
   establishing a plurality of voice call connections with a voice over IP (VoIP) gateway;
   receiving audio data from a network source;
   allocating a high priority thread for streaming said received audio data to a selected one of said plurality of voice call connections through said VoIP gateway; and,
   allocating a reduced priority thread for transmitting silence data to said VoIP gateway.

9. The method of claim 8, wherein said step of allocating a reduced priority thread comprises the step of allocating a normal priority thread for transmitting silence data to said VoIP gateway.

10. The method of claim 8, wherein said step of receiving audio data comprises the steps of:
    receiving audio data from said network source;
    packetizing said audio data; and,
    streaming said packetized audio data to selected ones of said plurality of voice call connections through said VoIP gateway.

11. The method of claim 10, wherein said streaming step comprises the step of transmitting said packetized audio data according to the real time protocol (RTP).

12. A voice data streaming method comprising the steps of:
    establishing a voice call connection with a voice over IP (VoIP) gateway;
    receiving audio data from a network source;
    assigning a high priority to a thread of execution in which said received audio data can be streamed to said VoIP gateway; and,
    reducing said high priority to a normal priority when said received audio data has been completely streamed to said VoIP gateway.

13. The method of claim 12, further comprising the step of streaming silence data in said thread of execution after said high priority has been reduced to said normal priority.

14. The method of claim 13, further comprising the steps of:
    packetizing said audio data for transmission over a packet-switched network; and,
    streaming said packetized audio data in said high priority thread of execution according to the real time protocol (RTP).

15. The method of claim 12, wherein said step of receiving audio data from a network source comprises the step of receiving a recorded audio prompt from said network source.

16. The method of claim 12, wherein said step of receiving audio data from a network source comprises the step of receiving synthesized audio from a text-to-speech (TTS) engine.

17. A machine readable storage, having stored thereon a computer program for streaming voice data, said computer program having a plurality of code sections executable by a machine for causing the machine to perform the steps of:
    establishing a plurality of voice call connections with a voice over IP (VoIP) gateway;
    receiving audio data from a network source;

allocating a high priority thread for streaming said received audio data to a selected one of said plurality of voice call connections through said VoIP gateway; and, allocating a reduced priority thread for transmitting silence data to said VoIP gateway.

18. The machine readable storage of claim 17, wherein said step of allocating a reduced priority thread comprises the step of allocating a normal priority thread for transmitting silence data to said VoIP gateway.

19. The machine readable storage of claim 17, wherein said step of receiving audio data comprises the steps of:

receiving audio data from said network source;

packetizing said audio data; and, streaming said packetized audio data to selected ones of said plurality of voice call connections through said VoIP gateway.

20. The machine readable storage of claim 19, wherein said streaming step comprises the step of transmitting said packetized audio data according to the real time protocol (RTP).

21. A machine readable storage, having stored thereon a computer program for streaming voice data, said computer program having a plurality of code sections executable by a machine for causing the machine to perform the steps of:

establishing a voice call connection with a voice over IP (VoIP) gateway;

receiving audio data from a network source;

assigning a high priority to a thread of execution in which said received audio data can be streamed to said VoIP gateway; and, reducing said high priority to a normal priority when said received audio data has been completely streamed to said VoIP gateway.

22. The machine readable storage of claim 21, further comprising the step of streaming silence data in said thread of execution after said high priority has been reduced to said normal priority.

23. The machine readable storage of claim 22, further comprising the steps of:

packetizing said audio data for transmission over a packet-switched network; and, streaming said packetized audio data in said high priority thread of execution according to the real time protocol (RTP).

24. The machine readable storage of claim 21, wherein said step of receiving audio data from a network source comprises the step of receiving a recorded audio prompt from said network source.

25. The machine readable storage of claim 21, wherein said step of receiving audio data from a network source comprises the step of receiving synthesized audio from a text-to-speech (TTS) engine.

* * * * *